United States Patent
Müller et al.

(10) Patent No.: US 11,170,191 B2
(45) Date of Patent: Nov. 9, 2021

(54) CODE READER AND METHOD FOR READING OF OPTICAL CODES

(71) Applicant: SICK AG, Waldkirch (DE)

(72) Inventors: Romain Müller, Waldkirch (DE); Dirk Strohmeier, Waldkirch (DE); Pascal Schüler, Waldkirch (DE); Marcel Hampf, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/075,516

(22) Filed: Oct. 20, 2020

(65) Prior Publication Data

US 2021/0117634 A1      Apr. 22, 2021

(30) Foreign Application Priority Data

Oct. 22, 2019   (EP) .................................... 19204602

(51) Int. Cl.
   *G06K 7/14*         (2006.01)
(52) U.S. Cl.
   CPC ......... *G06K 7/1417* (2013.01); *G06K 7/1413* (2013.01)
(58) Field of Classification Search
   CPC ............................ G06K 7/1417; G06K 7/1413
   See application file for complete search history.

(56) References Cited

U.S. PATENT DOCUMENTS

| | | | |
|---|---|---|---|
| 2008/0292141 A1* | 11/2008 | Yu | G06K 9/228 |
| | | | 382/106 |
| 2009/0200380 A1 | 8/2009 | Longacre et al. | |
| 2018/0033256 A1* | 2/2018 | Hamidat | G06K 7/1447 |

FOREIGN PATENT DOCUMENTS

| | | |
|---|---|---|
| DE | 69801422 T2 | 5/2002 |
| DE | 102018105301 A1 | 9/2019 |
| EP | 1645839 A1 | 4/2006 |
| EP | 2341461 A1 | 7/2011 |

OTHER PUBLICATIONS

Office Action dated Aug. 10, 2020 issued in corresponding European Application No. 19204602.7.
Search Report dated Apr. 7, 2020 issued in corresponding European Application No. 19204602.7.

* cited by examiner

*Primary Examiner* — Matthew Mikels
(74) *Attorney, Agent, or Firm* — Nath, Goldberg & Meyer; Jerald L. Meyer

(57) ABSTRACT

A code reader for the reading of optical codes is provided that has an image sensor for the detection of image data with the code and that has a control and evaluation unit that is configured to read the code with at least one decoding method, wherein the control and evaluation unit is connected to a distance sensor that determines a distance value for the distance of the code. The control and evaluation unit is further configured for the purpose of setting at least one parameter and/or including at least one additional algorithm of the decoding method for the decoding method in dependence on the distance value.

18 Claims, 2 Drawing Sheets

Fig. 3

| distance [mm] | 1D module size [Pixel] | 2D module size [Pixel] | 1D contrast | 2D contrast | sigma |
|---|---|---|---|---|---|
| 500 | N/A | 7.0-8.2 | 50-60 | N/A | N/A |
| 700 | 3.2-3.8 | 5.8-6.8 | 45-48 | 48-54 | 3.1-5.2 |
| 1000 | 2.2-2.6 | 4.6-5.3 | 32-42 | 36-48 | 3.2-4.3 |
| 1200 | 1.8-2.6 | 3.6-4.2 | 30-39 | 32-44 | 2.1-2.6 |
| 1400 | 1.4-1.9 | 2.8-3.8 | 24-36 | 26-36 | 1.2-1.4 |
| 1800 | 1.1-1.7 | 2.5-3.2 | N/A | N/A | N/A |

Fig. 4

| distance [mm] | Super-resolution | Upsampling | Suppression correction | Deblurring | Contrast widening |
|---|---|---|---|---|---|
| 500 | OFF | OFF | OFF | OFF | ON |
| 1200 | ON | OFF | OFF | ON | ON |
| 1800 | ON | ON | ON | ON | ON | ns and sorting of post, from lug-
CODE READER AND METHOD FOR READING OF OPTICAL CODES

FIELD

The invention relates to a code reader for the reading of optical codes that has an image sensor for the detection of image data with the code and that has a control and evaluation unit that is configured to read the code with at least one decoding method, wherein the control and evaluation unit is connected to a distance sensor that determines a distance value for the distance of the code, and to a method for the reading of optical codes in which image data having the code are detected and the code is read with at least one decoding method, wherein moreover a distance value for the distance of the code is determined.

BACKGROUND

Code readers are known from supermarket cash desks, for automatic package identification, sorting of post, from luggage handling in airports and from other logistical applications. A reading beam is guided by means of a rotary mirror or a polygonal mirror wheel transversely over the code in a code scanner. A camera-based code reader records images of the objects with the codes present thereon by means of an image sensor and an image evaluation software extracts the code pieces of information from these images. Camera-based code readers can also cope with different type of codes other than one-dimensional barcodes without further ado, with the codes being assembled like a matrix code also in two dimensions and making available more pieces of information.

In an important group of applications, the objects carrying the codes are guided past the code reader. In this connection a code scanner detects the respective codes guided one after another into its reading region. Alternatively, a line camera reads the object images with the code pieces of information successively and line-wise with the relative movement in a camera-based code reader. By means of a two-dimensional image sensor, image data are frequently recorded that more or less overlap depending on the recording frequency and conveying speed. Frequently a plurality of code readers are provided at a reading tunnel in order to record objects from a plurality or all sides so that the objects can be arranged in an arbitrary orientation on the conveyor.

In many instances the code reader is part of a complex sensor system. For example, at reading tunnels of conveyor belts it is usual to measure the geometry of the conveyed objects in advance with a specific laser scanner and to therefrom determine focus information, trigger points in time, image regions with objects and the like. In the DE 10 2018 105 301 A1 a distance sensor is integrated into a camera.

One of the most important parameter sizes of a code reader system is the reading rate as non-read codes lead to manual post-processing steps or even association errors. Now, diverse causes exist why the reading of a code fails. On flat objects and correspondingly large object distances to the code reader the illumination is no longer sufficient and the code contrast becomes less. The module size, this means the number of pixels per code module decreases and the noise increases. Vice versa for high objects and correspondingly small object distances the image tends to be over-illuminated and low in contrast with an effect similar to a low pressure, this means a too weekly printed code. Specifically, having regard to fixed focus systems at least small blurred images are recorded depending on the depth of field range.

As a further example, many interfering structures exist, for example the wood structure of a tray sorter. The decoder must be parameterized in a sensitive manner in order to also read codes on flat objects. This has the side effect that now also the interfering structures can be recognized as potential code regions and reading attempts can be made thereon and for this calculation capacity is lost.

Typically, the decoding algorithms and the preprocessing of the image are selected and parametrized for a certain application situation. This is initially a manual process. Known are moreover an auto setup and a matching during operation. The aim is to limit the search field of the decoding algorithm and in this way to optimize the reading rate with as low as possible decoding times. The auto setup automatically attempts to determine a good set of parameters prior to the actual operation. The dynamic matching is limited to slightly adapt this set of parameters in order to compensate gradual changes and drifts.

Thus, by means of auto setup one search space for the decoding algorithm is determined only once and statistically. The adaptation is only suitable for slow changes of the reading conditions. In the typical reading situation at a conveyor belt, for example, however, the reading conditions change in a highly dynamical manner purely due to the different object heights. An auto setup cannot be ideal for all object heights, but rather one has to find a good compromise. The adaptation in turn is, not intended for the fast changes of the object heights and far too passive with its slow rather slight parameter adaptations.

Generally, it can naturally be envisaged to process the image data respectively on a test basis with different parameter settings and algorithms. However, this can practically not be done with the large parameter space and with the numerous possible image processing steps.

SUMMARY

For this reason, it is an object of the invention to further improve the reading of optical codes.

This object is satisfied by a code reader and by a method for reading of optical codes in accordance with the respective independent claim. The optical code can be a barcode, but also a two-dimensional code in accordance with one of the diverse known standards. An image sensor detects image data, be it in a single respective recording or by stitching images from one or more image sensors at the same time or at different times, in particular from a successive line-wise detection. In order to read the code, the image data is processed and, in this connection, at least one decoding attempt is then undertaken for the found code region. An internal or external distance sensor moreover determines a distance value for the distance of the code. This can also be a distance value per image or for the code bearing object or a different larger surface, i.e. this must in no way exactly correspond to the code distance. Alternatively, a plurality of distance values to different image regions are measured.

The invention is based on the basic idea of carrying out an adaptation in dependence on the distance value. In this way, the decoding method is respectively optimized in a manner matching the code distance. The adaptation can be a dynamic auto parametrization, this means an adaptation of the search space, that sets parameters of the decoding method in accordance with the distance value. Alternatively or additionally, certain steps of the pre-processing of the image data or of the decoding method which are referred to in this connection as additional algorithms are drawn on in dependence on the distance value and for this reason can be carried out or not be carried depending on the code distance.

The invention has the advantage that the decoding method can run significantly more efficiently and has larger chances of reading the code. Thus, the two central characteristics reading rate and decoding speed are optimized. Through the distance matched parametrization, the search space is limited to a promising region that is not predetermined in advance, but has to be dynamically found. Some code regions that are valid as common code candidates can be discarded immediately with reference to the adapted parameter space prior to the carrying out of decoding attempts demanding in effort and cost. For example, a region of weak contrast can be discarded directly through the additional criterion of a small distance value as an interference contrast. Through the narrow parameter specifications one can possibly also recognize fast that it will be hopeless to read a code so that at this point the reading rate cannot be improved, however, at least calculation time can be saved and a decoding demanding in effort and cost is not even started. Moreover, specifically the additional algorithms are used that actually simplify the reading or even make the reading possible.

The improvements of the decoding method achieved by means of the invention frequently permit the use of a code reader without a focus adaptation where previously only an autofocus system demanding in effort and cost could previously achieve a sufficient reading rate. Thereby a considerable cost advantage arises.

The distance sensor is preferably an optoelectronic distance sensor integrated into the code reader, in particular in accordance with a time of flight method. Thereby, distance values are always made available without the requirement of including the code reader in a system having a distance sensor. Alternatively, it is however also plausible to connect the code reader, for example, to a laser scanner, that measures distance profiles.

The parameter is preferably at least one of the following: module size, contrast, a blur of the edges. The module size, for example the number of pixels per module, helps the decoding method to identify and to differentiate the individual code modules. The contrast is, for example, stated as the difference between the bright and dark code elements or as an average value of the brightness. The blur of the edges is a degree of how approximately wide in pixels an edge is. Contrast and blur support the decoding method therein to differentiate between the bright and dark code elements and to find the position of the edges therebetween.

The control and evaluation unit preferably stores a parameter table with distance values and associated parameters that are formed and/or updated by means of measured values of the parameters on a successful reading of codes. By means of the stored parameter table the parameters to be set can be looked up very simply with reference to the different distance value. The parameter table is constructed by means of successful reading attempts and is preferably continuously updated in such a way that it matches to the current application situation. The code reader thus learns to read the codes faster and better. The distance values of the parameter table can be graduated more coarsely or finely, wherein also an interpolation or extrapolation of parameters is plausible for distance values that cannot be found in the parameter table.

The control and evaluation is preferably configured to read a code with different parameters to attempt to improve the parameter table. In this way one does not mean the actual reading of codes. Rather, reading attempts are then carried out with different parameters than those so far that were considered ideal, when calculation capacity is available for this purpose and indeed selectively on code regions that have already been successfully read (Good Read) and such in which this has so far not been possible (NoRead). In this manner gaps in the parameter table can be filled or their entries improved.

The additional algorithm is at least one of the following: down-sampling, up-sampling, super resolution, local contrast increase, de-blurring, suppression correction. On down- and up-sampling the image resolution is improved or, where the original image resolution is not even actually necessary, for example for a very close code it can be artificially decreased for a faster reading of codes. Super resolution refers to an algorithmic sub-pixel resolution improvement of several recordings. Local contrast increase attempts to sharpen the edges while contrast widening rescales the image data over a large part of the available brightness range or grey scale value range. Different algorithms are known of which the Lucy-Richardson-Deconvolution is mentioned by way of example for a de-blurring. Suppression correction is an algorithm to make faintly printed codes more readable with similar effects also occurring on an over exposure. The mentioned additional algorithms are known per se and are not the subject-matter of the invention. However, already due to the calculation capacities, these can simply not be used together. Moreover, the reading result would thereby not necessarily be improved, depending on the situation an additional algorithm can bring about the opposite of what is desired. A particularly suitable combination of additional algorithms results depending on the spacing of the object and this combination is applied in accordance with the distance value.

The control and evaluation unit preferably stores an additional algorithm table with distance values and associated additional algorithms that are formed and/or updated by means of codes read with a respective additional algorithm. The same is correspondingly true for the additional algorithm table as for the parameter table.

The control and evaluation unit is preferably configured to attempt different combinations of additional algorithms for improving the additional algorithm table, in particular in code regions in which so far no code could be read. In contrast to the parameter table, the additional algorithm table does not have to be filled simply with successful reading attempts. The parameters are at least partly measured on reading. In contrast, additional algorithms are already selected prior to their reading attempt. For this reason, the additional algorithm table must be previously occupied, preferably initially from general experience. Then, test reading attempts are carried out with arbitrary or potentially suitable combinations based on experience. Having regard to code regions whose codes have already been read (GoodRead), a combination of additional algorithms is thus already known that led to a success. Then, the combination can only be further improved by test reattempts, in particular with regard to the reading speed. In code regions, in which the reading so far failed (NoRead), the search is more profitable, as by finding a matching combination of additional algorithms the reading rate is improved.

The control and evaluation unit is preferably configured for the purpose of testing additional algorithms in phases in which no new codes are read. During the actual decoding, for example while the code bearing object is present in the reading range of the code reader, the calculation capacities are typically used to the full capacity due to the actual decoding. Test reading attempts for improving the additional algorithms for this reason preferably take place in idle phases, for example in the time intervals up until the next object is conveyed into the reading region. Apart from that, such idle times can also be used for the above mentioned reading attempts with new, parameter sets, not yet recorded in the parameter table.

The control and evaluation unit preferably has a test decoder for testing of parameters and/or additional algorithms. The test decoder runs independently of the actual decoding method and for this reason does not necessarily rely on the idle times. For this purpose, for example an own processor core or thread is used. However, this has the disadvantage that calculation capacities are again bound that could alternatively also be used for the actual decoding method. However, at least no timely demands exist for the test decoder in such way that the processor core, as required, for example when the actual decoding method requires a particularly high calculation capacity, can be set free for different tasks, alternatively the thread with corresponding low priority can be operated.

The control and evaluation unit is preferably configured to select parameters and/or additional algorithms for the actual decoding of code regions. In this connection it is assumed that the image data can initially be segmented in order to find code regions. The parameters set in accordance with the invention in dependence on distance values, and/or the selected additional algorithms in accordance with this embodiment relate to the steps following the segmentation and only relate to the code regions.

The control and evaluation unit is preferably configured to select parameters and/or additional algorithms for a preprocessing of the image data independent of the code regions. This only relates to the image data before or during the segmentation. An additional algorithm and/or a combination of additional algorithms that can be used in this manner can, preferably, be verified in advance, this means that codes could be successively read after application of this additional algorithm at the measured distance value, possibly also by the test decoder.

The preprocessing is preferably implemented in an FPGA (Field-Programmable Gate Array). Such a component is particularly well suited to carry out relatively simple and monotonous processing steps at a high speed with large data volumes. The actual decoding method in contrast preferably runs on a microprocessor that can be programmed in a flexible manner and is unloaded by the FPGA.

The preprocessing preferably comprises an up-sampling, a down-sampling and/or a contrast widening, wherein in particular the contrast widening comprises a selection of a higher valued or a lower valued bit region of the image data depending on the distance value. In this way, depending on the distance value, a sufficient image resolution is achieved by up-sampling or the later processing speed is increased by down-sampling. Possibly, even the image recording frequency can be increased, as by the down-sampling more images can be processed in a shorter period of time. Contrast widening utilizes the available spectrum of brightness values and/or grey scale values in an improved manner. In particular it is also plausible that image data with larger bit widths are initially present, for example, 12 bit or 16 bit, than for the actual decoding method, for example with 8 bit. In this case a particularly simple contrast widening is possible. The larger bit width is not calculated down to the lower bit width. Rather higher valued or lower valued bits are cropped depending on the distance value. An image having a larger distance value is generally darker such that the higher valued bits in any case barely bear any real image information. In a mirror image kind of way this is also true for the low valued bits of an image with small distance values.

The method in accordance with the invention can be furthered in a similar way and in this connection shows similar advantages. Such advantageous features are described by way of example, but not conclusively in the dependent claims adjoining the independent claims.

BRIEF DESCRIPTION OF THE DRAWINGS

The invention will be described in the following also with regard to further features and advantages by way of example with reference to embodiments and by means of the submitted drawing in detail. The images of the drawing show in:

FIG. 3 an exemplary parameter table with distance values and associated parameters for the decoding method; and FIG. 4 an exemplary additional algorithm table with distance values and associated additional algorithms to be used.

DETAILED DESCRIPTION

Figure 1:
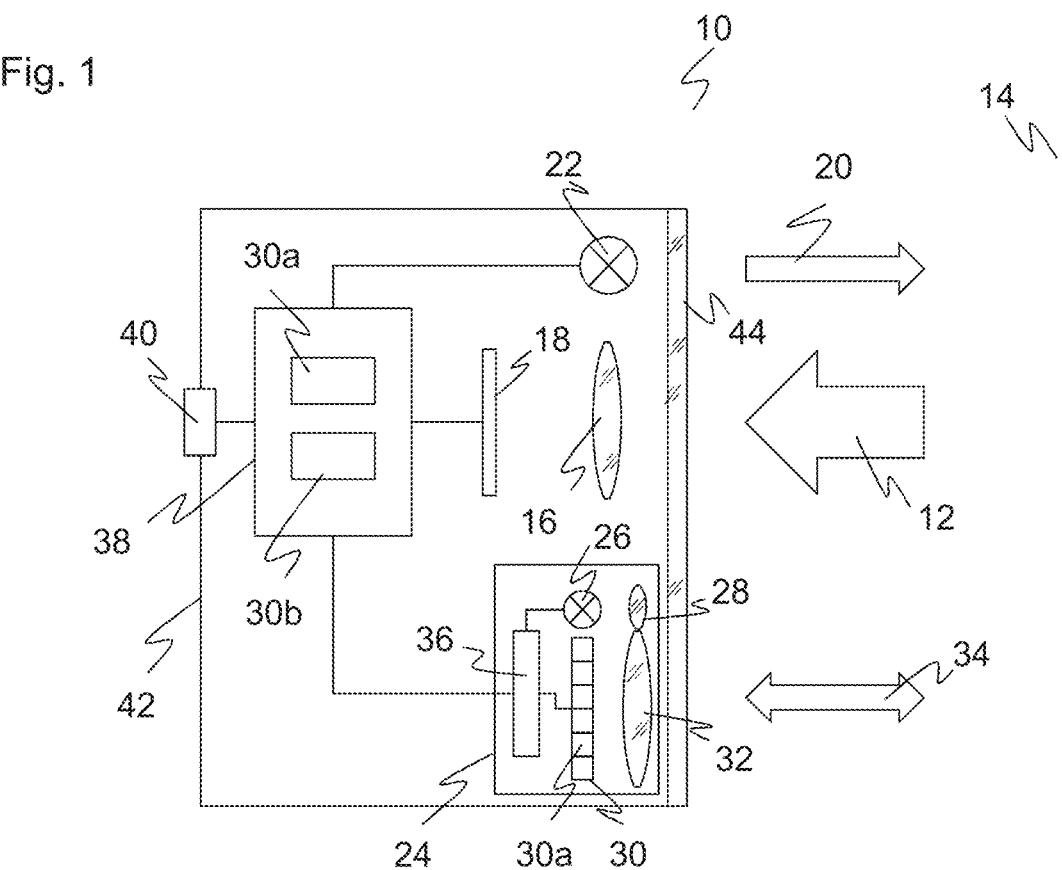
FIG. 1 a schematic sectional illustration of a camera-based code reader having a spatially resolved optoelectronic distance sensor.

FIG. 1 shows a schematic sectional illustration of an optoelectronic code reader 10. Received light 12 from a detection region 14 is incident on a reception optics 16 that guides the received light 12 to an image sensor 18. The optical elements of the reception optics 16 are preferably configured as an objective comprising a plurality of lenses and different optical elements, such as apertures, prisms and the like, but for reasons of simplicity are currently only represented by a single lens. Preferably, no focus adjustment and in particular no autofocus system is provided. The invention can indeed also be used with a focus adjustment, however, should actually achieve exceptional reading results already with a cost-effective fix focus system.

In order to illuminate the detection region 14 during a recording of the code reader 10 with transmitted light 20, the code reader 10 comprises an optional illumination unit 22 that is illustrated in FIG. 1 in the form of a simple light source and without a transmission optical system. In different embodiments a plurality of light sources, such as LEDs or laser diodes, are arranged about the reception path, for example in ring-shaped manner, the laser diodes can also be multi-colored and controllable groupwise or individually in order to adapt parameters of the illumination unit 22 such as their color, intensity and direction.

In addition to the actual image sensor 18 for the detection of image data the code reader 10 comprises an optoelectronic distance sensor 24 that measures distances to objects in the detection region 14 with a time of flight (ToF) method. The distance sensor 24 comprises a ToF light transmitter 26 having a ToF transmission optics 28, as well as a ToF light receiver 30 with ToF reception optics 32. In this way a ToF light signal 34 is transmitted and received again. A time of flight measurement unit 36 determines the runtime of the ToF light signal 34 and therefrom the distance to an object at which the ToF light signal 34 is thrown back. The optoelectronic distance measurement by means of light time of flight methods is known and for this reason will not be explained in detail. In this connection, also highly integrated solutions exist in which the ToF light receiver 30 is accommodated on a common chip together with the light time of flight measurement unit 36 or at least parts thereof, such as for example TDCs (Time-to-Digital-Converter) for time of flight measurements. For this purpose, in particular a ToF light receiver 30 that is assembled as a matrix of SPAD light reception elements 30*a* (Single-Photon Avalanche Diode). In this way, also laterally spatially resolved distance measurements are possible that provide a plurality of distance values for different image regions. The assembly of the distance sensor 24 is purely by way of example and it is plausible to measure a distance value or a plurality of distance values alternatively with a different optical or non-optical method.

A control and evaluation unit 38 is connected to the illumination unit 22, the image sensor 18 and the distance sensor 24. The control and evaluation unit 38 is responsible for the control, evaluation and other coordination tasks in the code reader 10. It comprises one or more processing components, such as an FPGA 38*a*, and a microprocessor 38*b*, and evaluates the image data of the image sensor 18. In this connection code regions are found in the image data and their codes are read. Distance values of the distance sensor 24 are used in order to parametrize the decoding method and/or to adapt the decoding algorithm as will be described in detail in the following with reference to the FIGS. 3 and 4.

Via an interface 40 the code reader 10 outputs the information such as read codes or image data. It is plausible that the control and evaluation unit 30 is not connected to the actual code reader 10, but rather is connected as an own control device to one or more code readers 10. Then the interface 40 also serves as a connection between internal and external control and evaluation. The control and evaluation functionality can practically be arbitrarily distributed on internal and external components, wherein the external components can also be connected via a network or the cloud. This all will not be differentiated here any further and the control and evaluation unit 38 will be assumed to be a part of the code reader 10 independent of the specific implementation. The code reader 10 is protected by a housing 42 that is terminated by a front screen 44 in the front region where the received light 12 is incident.

Figure 2:
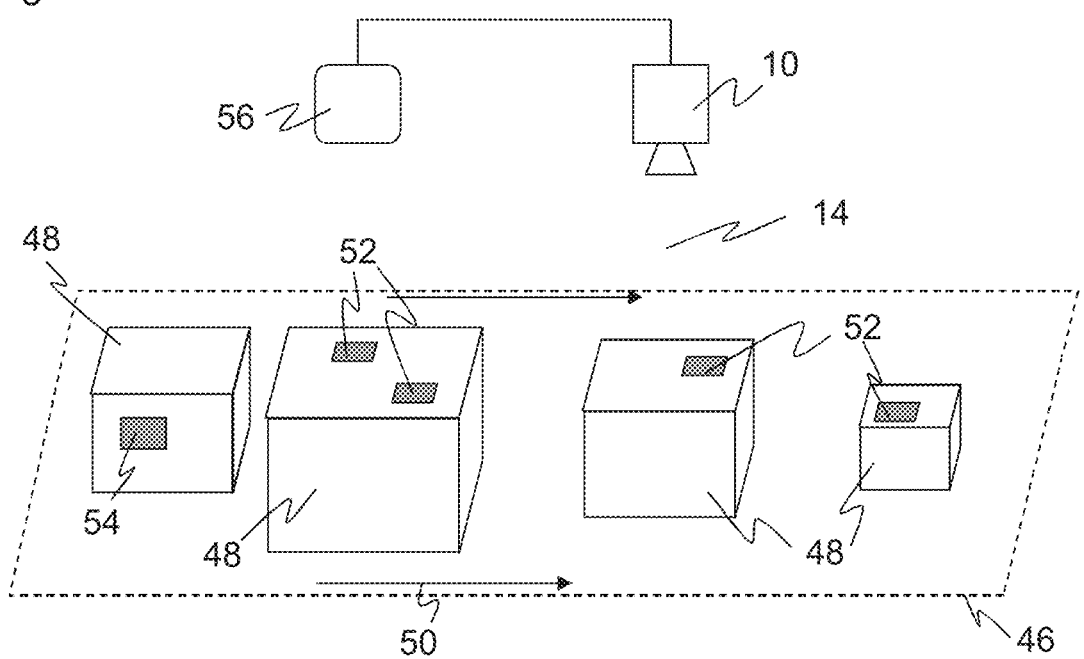
FIG. 2 a three-dimensional view of an exemplary application of the code reader in an assembly at a conveyor belt.

FIG. 2 shows the code reader 10 in a preferred situation of application mounted above a conveyor belt 46 which conveys objects 48, as indicated by the arrow 50, through the detection region 14 of the code reader 10. The objects 48 bear code regions 52 at their outer surfaces that are detected by the code reader 10 and evaluated. These code regions 52 can only then be recognized by the code reader 10 when they are visibly applied to the upper side or at least visible from above. For this reason, in deviation from the illustration of FIG. 2, a plurality of code readers 10 can be assembled for the reading of codes from different directions, for example from the side or from below in order to enable a so-called omni-reading from all directions. The arrangement of the plurality of code readers 10 to a reading system in practice frequently takes place as a reading tunnel. This stationary application of the code reader 10 at a conveyor belt is very frequent in practice. The invention however also relates to the code reader 10 itself, and/or its methods of decoding of codes implemented therein in such a way that this example should not be understood as limiting.

A code reader 10 with an integrated distance sensor 24 is illustrated in FIG. 1. Alternatively or additionally, a geometry detection sensor 56, for example a laser scanner, can additionally or alternatively detect a profile of the objects 48 and forward corresponding distance values from the objects 40 or even forwarded the code regions 52 to the code reader 10.

The specific imaging method is not decisive for the invention so that the code reader 10 can alternatively also be assembled in accordance with a different principle known per se. For example, respectively only one line is detected be it by means of a line-shaped image sensor or by a scanning method, wherein in the last-mentioned case it is sufficient if the image sensor 18 is a simple light receiver, such as a photodiode. One can also directly attempt to read the code from an image line or the control and evaluation unit 38 stitches the image data together from lines detected in the course of a relative movement. With a matrix-shaped image sensor, a larger region can already be detected in one recording, wherein also here the stitching of recordings both in movement direction and also transverse thereto is possible. The plurality of recordings are recorded one after another and/or by a plurality of code readers 10 that, for example, only together cover the overall width of the conveyor belt 46 with their detection regions 14, wherein each code reader 10 at the same time only records one tile of the overall image and the images are stitched by image processing. Also, only a fragmented decoding within individual tiles with subsequent stitching of the code fragments is plausible.

As was already mentioned in the introduction, the reading rate is one of the most important characteristics of the code reader 10. Now different causes exist why a decoding method fails (NoRead). In this connection it should initially be noted that the control and evaluation unit 38 does not have sufficient calculation capacity and/or insufficient time between the detected objects 48 in order to test a plurality of parameters and pre-processing steps. A code would thus frequently be readable with the present algorithm components and image data, but not with these practical limitations of the application.

For too low a contrast the code regions 52 are not found reliably in the image. An intelligent contrast widening could bring about a remedial action. However, this would not be advantageous for all object heights, as in contrast a generally readable code could no longer be readable by the also increased noise components.

The module size, preferably stated in pixels per code module can be too small to decode. However, the demand in effort and cost to generally use an up-sampling or a super resolution algorithm for all code regions 52 and object heights, is not affordable due to the increase in run time. Thereby, generally avoidable decoding fails or non-readable codes result.

Specifically having regard to fix focus systems code regions 52 are possibly recorded out of focus. The demand in effort and cost of processing the code regions 52 by algorithm, for example by an iterative de-blurring is generally not possible and not possible for all object heights.

Code regions 52 can be outshined in such a way that suppression effects have to be removed. However, this is not necessarily helpful when no suppression effects exist and in turn too demanding in effort and cost for an unconditional, constant application.

The search contrast with which the code regions 52 are localized in the image data must be set in a sensitive manner in order to also find code regions 52 at flat objects 48 at a large distance. In the vicinity of the ideal focus position, also interference contrasts are then recognized as code regions 52 (false positive) and in this way on a whole too many code regions 52 have to be calculated.

As is illustrated by means of the examples, the decoding method can be significantly improved and accelerated, when a parametrization and selection of the decoding components or additional algorithms is made in dependence on the specific object distances. For this reason, the control and evaluation unit 38 takes over a dynamic auto-parametrization and/or selection of additional algorithms in dependence on the distance values of the distance sensor 24 and/or the geometry detection sensor 56.

FIG. 3 shows a parameter table that associates the different distances or distance values of a code region 52 to matching parameters. The specific number values are to be understood purely by way of example. It is advantageous when the available distance values are laterally spatially resolved and correspond to the distance of the respective code region 52. A more coarse distance value, for example a single distance value to the object 48, however, also has a large contribution. The resolution in distance direction can be finer or coarser, the parameter table can thus have more or less lines than in FIG. 3. Missing lines can be supplemented by interpolation or extrapolation.

The control and evaluation unit 38 can read the matching parameters for the decoding method from the parameter table for the current distance value of the code region 52 to be processed and thereby limit its search space. In particular the module size, the contrast and the blurriness referred to as sigma can be considered as parameters. A differentiation in 1D codes and 2D codes is plausible. By means of the matching parameters a differentiation in bright and dark regions of the code, as well as the recognition, localization and measurement of code modules is significantly simplified in the decoding method. The complex decoding methods used today also know further parameters that can likewise be recorded in the parameter tables. This is only sensible for such parameters that have a significant dependence on the distance value.

The values of the parameter table can principally be pre-stored by a specialist. Yet the parameter table can preferably also be assembled during operation and improved and indeed by means of code regions 52 in which a code was successfully read (GoodRead). Then, the parameters are namely measured with which that was achieved and recorded in the parameter table. In as far as an entry already exists, this is preferably not simply overwritten, but adapted, for example by averaging or by changing range boundaries. Thus, the module size is present after a successful read with sub-pixel accuracy. The contrast can be stated as the average value of the bright respectively dark classified code regions and the degree of blurriness sigma can be estimated at the identified edge transitions.

Specifically, after a short period of operation it can happen that no value exists yet for a tuple distance value/parameter which is referred to with N/A. Then, a parameter for the next lying distance value is used or a parameter is interpolated or extrapolated for different distance values.

Thus, the allocation of the parameter tables can be taught in operation and/or further improved. The decoding method parametrizes itself dynamically in dependent of the actual distance value and learns something new due to the successful reading attempts and works with the best applicable prior knowledge for segmenting and decoding for the current object heights.

It is plausible to once again verify a respective update of the parameter table. For this purpose, already read codes are read again from the image data with the parameter set to be stored afresh in the parameter table. If codes are lost in this connection then the search space should be increased again.

The update is thus at least partly withdrawn or newly calculated with the older entries. Such verifications can be carried out during idle phases of the code reader 10 between two objects 48 conveyed one after the other in the detection region 14. Typically, the code reader 10 receives a signal when a new object 48 enters the detection region 14 and exits this again (Gate ON/OFF). Thus, the start of such an idle phase is known and as soon as a new object 48 is to be processed, the test-wise reading attempts are aborted.

It is also plausible to provide a test decoding instance for such tasks. The test decoder is, for example, implemented on an own processor core, as an own thread or externally in a cloud or the like and, preferably makes available its calculation capacity for the actual decoding method when it is needed there. The test decoder can, if required, access intermediate processing steps of the actual decoding method. The verification is not critical in time, as long as the present parameter table can simply be used and as long as it cannot be updated. It is also plausible to use idle phases and/or a test decoder for the purpose of testing the parameter space on the presence of image data and already processed code regions 52 with new parameter combinations be it with reads (GoodRead) or not (NoRead) in order to further improve the parameter table.

FIG. 4 shows an additional algorithm table that associates the different distances or distance values of a code region 52 to be applied (ON) and not to be applied (OFF) to additional algorithms. Thereby, a respective matching selection of additional algorithms is used. The additional algorithm table is to be understood purely by way of example and includes more or less lines, as well as other associations of additional algorithms to be used or not to be used. The distance dependent selection of additional algorithms in accordance with FIG. 4 can be combined with a distance dependent parameterization in accordance with FIG. 3 or not.

Additional algorithms are no measurement value and can therefore not be directly determined from successful reading attempts. It can merely be determined that certain combinations of additional algorithms have enabled a code reading and different ones have not; however, with it not being clear whether the combination was ideal in one case nor whether a combination would have been available in a different case that would still have enabled the reading.

In turn a further alternative exists therein to pre-store the additional algorithm table with specialist knowledge. This specialist knowledge can be obtained by simulation or evaluation of earlier image data that results from the same or a different situation of application. However, also the additional algorithm table is preferably automatically generated and extended.

For this purpose, different combinations of additional algorithms are tested in idle phases or in a test decoder, as described above. In the course of time even more improved combinations for associated distance values arise in the additional algorithm table with which the reading rate can be increased and/or the decoding method is accelerated. The combination of additional arguments is preferably not arbitrarily tested, but varies successful earlier reading attempts with the same or similar distance values. Incidentally it is plausible to store several combinations in the additional algorithm table for a distance value that are tested by the decoding method in the actual operation (Retry), possibly one after another. A basic configuration can always be to try and cope without an additional algorithm on the first reading attempt.

If it becomes possible to read a code after application of a certain combination of additional algorithms, in particular one that could previously not be read then it is plausible at the same time to also update the parameter table with the values now measured on the successful reading attempt.

The additional algorithm table of FIG. 4 in its columns includes several examples for additional algorithms. By up-sampling or down-sampling the resolution in pixels is improved per length unit or vice versa can be reduced when the original resolution is not even required also for obtaining run time advantages. The up-sampling and down-sampling in particular relates to 2D codes. Super resolution is a method that calculates a sub-pixel precise resolution from a plurality of recordings and is suitable, in particular, but not exclusively for barcodes. By local contrast increase the edges between the modules are found more precisely. A general contrast widening is improved in particular for the initial finding of code regions 52 in the image data. For example, iterative methods such as Lucy-Richardson-Deconvolution are plausible for an intelligent de-blurring. A suppression correction relates to actually too faintly printed codes, however, the effects of an over-illumination are comparable and for this reason also correctable thereby. All these additional algorithms whose listing should not be exclusive are generally known. The point of the invention is to find matching additional algorithm to be used in dependence on the distance.

For reasons of illustration a few specific examples shall be discussed. Suppression effects by over-illumination in particular arise for small distance values. An up-sampling or a super resolution method is suitable particularly for larger distance values in order to still be able to read the code. This is generally the most important aim. Down-sampling will typically not improve the reading rate, but is possible for short distance values in order to increase the work speed. Thus, prior to using a down-sampling it should be verified by test decoder or in an idle phase that no codes are lost in this way.

Thus, expectations exist which additional algorithms are more likely to be suitable for close distances or far distances. However, this is only of interest in the sense of a possible pre-allocation of the additional algorithm table. Otherwise, the system itself independently finds the matching associations and combinations.

A few of the measures such as super resolution or de-blurring can be summarized under the heading of expanding the depth of field range, in particular of a fixed focus system, by software measures and in this connection to limit time of flight losses.

Having regard to larger distance values many image regions are very dark. Then a contrast widening can be used and/or previously be tested with the test decoder. So that the test decoder does not change the image data the contrast widening is preferably realized via an intermediately switched lookup table of grey scale values.

Having regard to iterative additional algorithms, such as the de-blurring, it is advantageous to know the number of required iterations. The larger the degree of blurriness referred to with sigma in FIG. 3 is, the more iterations are generally required for a sufficient re-sharpening. Too many iterations, however, increase the noise portion in such a way that the image quality then sinks again. As the degree of blurriness is dependent on the distance value, the required number of iterations can likewise be taught and parameterized in dependence on distance.

Beyond the above examples, the distance value can also be used as its own criterion that an image region does not bear a code from the start. This is in particular true when the distance value corresponds to the height of the conveyor belt 46. For this purpose, the code reader 10 should be calibrated with respect to its assembly height and the distance values should be measured as precise as possible in order to not oversee flat objects 48. This is particularly advantageous for a tray sorter whose trays have a wood structure that could be confused with code regions 52. Under the mentioned conditions no reading attempts are carried out in order to accelerate the decoding when a distance value corresponds to the conveyor belt 46 and/or to an empty tray.

So far additional algorithms have been described that are preferably applied at the already segmented code regions 52. Some additional algorithms for preprocessing can, however, also already be used on the image data prior to the segmentation. This preferably takes place in a processing component that is suitable for the fast application of comparatively simple steps on a large amount of data, such as in an FPGA (Field-Programmable Gate Array). The actual decoding method is preferably implemented more likely in a flexible component, such as a microprocessor, that is unloaded by the pre-processing of the FPGA.

Such previously applied additional algorithms should preferably be found in a similar manner independent on distance verified and used as was previously described. Examples for additional algorithms suitable in this connection are an up-sampling or a down-sampling, as well as a contrast widening.

For example, the test decoder has verified a plurality of times that an up-sampling has to take place from a certain distance. After this verification, the FPGA now receives the instruction to up interpolate the original image and possibly also to sharpen this starting from this distance. Vice versa, also a down-sampling and/or binning can be verified. The test decoder has thus determined that up to a certain distance the codes can also be read with less highly resolved image data, without a reduction of the reading rate. On undercutting this distance the input images are now down-calculated in the FPGA in order to improve the runtime of the decoding method. A prerequisite for this is that the test decoder can image the calculations of the FPGA with a sufficient conformity such that the verification holds true.

An FPGA offers the possibility of implementing a distance dependent contrast widening in a particularly simple manner. As frequently the input data of the image sensor 18 and in this way of the FPGA have a higher bit depth, for example of 12 bit or of 16 bit, than the actual decoding method that typically works with an 8 bit grey scale value. Rather than now resealing the higher bit depth in the FPGA, 8 higher or lower value bits can be cropped in dependence on the distance value which implicitly corresponds to a simplified contrast widening. For a larger distance with darker images namely the upper bits no longer bear any information so that the lower bits can be selected. Correspondingly for a shorter distance with bright images the lower bits are indeed not without information, however, having the highest noise component are less decisive. In order to suppress the noise also further FPGA operations are plausible, such as a median filtering or other smoothing. Specifically having regard to small module sizes, such a filtering is counterproductive such that also the application of such filters is preferably initially verified by the test decoder.

The invention claimed is:

1. A code reader for the reading of optical codes, the code reader comprising:
   an image sensor for the detection of image data with the code; and
   a control and evaluation unit that is configured to read the code with at least one decoding method,
   wherein the control and evaluation unit is connected to a distance sensor that determines a distance value for the distance of the code, and
   wherein the control and evaluation unit is furthermore configured to set at least one parameter and/or to factor in at least one additional algorithm of the decoding method for the decoding method in dependence on the distance value to limit the reading of the code to a code region corresponding to the distance value.

2. The code reader in accordance with claim 1,
   wherein the distance sensor is an optoelectronic distance sensor integrated into the code reader.

3. The code reader in accordance with claim 2,
   wherein the optoelectronic distance sensor operates in accordance with a time of flight method.

4. The code reader in accordance with claim 1,
   wherein the parameter is at least one of the following: module size, contrast, and a blur of the edges.

5. The code reader in accordance with claim 1,
   wherein the control and evaluation unit stores a parameter table with distance values and associated parameters that are formed and/or updated by means of measured values of the parameters on a successful reading of codes.

6. The code reader in accordance with claim 5,
   wherein the control and evaluation unit is configured to attempt to read a code with different parameters for an improvement of the parameter table.

7. The code reader in accordance with claim 1,
   wherein the additional algorithm is at least one of the following: down-sampling, up-sampling, super resolution, local contrast increase, de-blurring, and suppression correction.

8. The code reader in accordance with claim 1,
   wherein the control and evaluation unit stores an additional algorithm table with distance values and associated additional algorithms that are formed and/or updated by means of codes read with the respective additional algorithm.

9. The code reader in accordance with claim 8,
   wherein the control and evaluation unit is configured to test different combinations of additional algorithms for an improvement of the additional algorithm table.

10. The code reader in accordance with claim 8,
    wherein the control and evaluation unit is configured to test different combinations of additional algorithms for an improvement of the additional algorithm table in code regions in which no code could so far be read.

11. The code reader in accordance with claim 1,
    wherein the control and evaluation unit is configured to test parameters and/or additional algorithms in phases in which no new codes are read.

12. The code reader in accordance with claim 1,
    wherein the control and evaluation unit has a test decoder for testing of parameters and/or additional algorithms.

13. The code reader in accordance with claim 1,
    wherein the control and evaluation unit is configured to select parameters and/or additional algorithms for the actual decoding of code regions.

14. The code reader in accordance with claim 1,
    wherein the control and evaluation unit is configured to select parameters and/or additional algorithms for a preprocessing of this image data independent of code regions.

15. The code reader in accordance with claim 14,
    wherein the preprocessing is implemented in an FPGA.

16. The code reader in accordance with claim 14,
    wherein the preprocessing comprises an up-sampling, a down-sampling and/or a contrast widening.

17. The code reader in accordance with claim 16,
    wherein the contrast widening comprises a selection of a higher order or a lower order bit region of the image data in dependence on the distance value.

18. A method for the reading of optical codes in which image data having the code are detected and the code is read with at least one decoding method, wherein a distance value for the distance of the code is determined, at least one parameter is set and/or at least one additional algorithm of the decoding process is included for the decoding method in dependence on the distance value to limit the reading of the code to a code region corresponding to the distance value.

* * * * *